United States Patent [19]
Jackson

[11] 3,866,695
[45] Feb. 18, 1975

[54] BEARING CAVITY PRESSURE MAINTENANCE DEVICE FOR SEALED BEARING ROCK BIT

[75] Inventor: Robert Allen Jackson, Houston, Tex.

[73] Assignee: Dresser Industries, Inc., Dallas, Tex.

[22] Filed: July 1, 1974

[21] Appl. No.: 484,385

[52] U.S. Cl.................. 175/228, 175/372, 308/8.2
[51] Int. Cl............................ E21b 9/08, E21b 9/35
[58] Field of Search.......................... 175/227–229, 175/371, 372; 308/8.2

[56] References Cited
UNITED STATES PATENTS

| | | | |
|---|---|---|---|
| 3,048,230 | 8/1962 | Angel | 175/228 |
| 3,244,459 | 4/1966 | Ortloff | 308/8.2 |
| 3,476,195 | 11/1969 | Galle | 175/228 |
| 3,719,241 | 3/1973 | Bell | 175/228 |
| 3,735,825 | 5/1973 | Keller | 175/228 |
| 3,841,422 | 10/1974 | Crow | 175/229 |

*Primary Examiner*—David H. Brown
*Attorney, Agent, or Firm*—Eddie E. Scott

[57] ABSTRACT

A sealed bearing rotary rock bit is provided with an internal reservoir containing lubricant. The rock bit is used for drilling in a fluid-filled borehole wherein pressure differentials occur between the pressure of the lubricant in the internal reservoir and the pressure of fluid in the borehole. The rotary rock bit includes a bit body with at least one bearing shaft extending from said bit body. A cutter is rotatably mounted on said bearing shaft and bearing means between the cutter and the bearing shaft promote rotation of the cutter. Seal means are provided for retaining lubricant in the area between the cutter and the bearing shaft and preventing borehole fluids and debris from entering the bearing area. A lubricant reservoir is located in the bit body and means are provided for equalizing the pressure of lubricant in the lubricant reservoir with the pressure of fluid in the borehole. A passage extends cutter and the bearing shaft. Means are provided for allowing flow of lubricant from said lubricant reservoir to said bearing area in response to any pressure differential. Means are also provided for allowing flow of lubricant from said bearing area to said lubricant reservoir at pressure differentials above a predetermined pressure differential.

6 Claims, 6 Drawing Figures

3,866,695

BEARING CAVITY PRESSURE MAINTENANCE DEVICE FOR SEALED BEARING ROCK BIT

BACKGROUND OF THE INVENTION

The present inventon relates to the art of earth boring and more particularly to a system for providing lubricant to bearings between the cutter and bearing shaft of a sealed bearing rotary rock bit thereby enabling the bit to operate for an extended period of time under changing environmental conditions.

A sealed bearing rotary rock bit in general consists of a main bit body adapted to be connected to a rotary drill string. The bit includes at least one rotatable cutter mounted upon a bearing shaft extending from the main bit body, bearing systems between the cutter and the bearing shaft to promote rotation of the cutter, means on the outer surface of the cutter for disintegrating the formations as the bit and the cutter rotate, and a seal between the cutter and the bearing shaft to retain lubricant in the bearing area and to prevent borehole fluids and debris from entering the bearing area. A sufficient supply of lubricant is provided to the bearing systems throughout the lifetime of the bit by the lubrication system that includes a lubricant reservoir communicating with the bearing systems.

Problems have been encountered with prior art systems for supplying lubricant to the bearings because of the relatively long lifetime of modern bits and the wide variation of the environmental conditions encountered during the drilling operation. When a sealed bearing rotary rock bit is lowered into a well bore, the environmental pressure surrounding the bit increases at the rate of approximately one-half pound per square inch for each foot of depth. This means that at a depth of 10,000 feet the hydrostatic pressure on the outside of the bit could be 5,000 psi or more because of the weight of drilling fluid in the well bore above the bit. In order for a lubrication system to function properly at the elevated downhole pressures, some means must be provided to equalize the internal pressure of the lubricant in the lubrication system with the hydrostatic pressure of the drilling fluid in the well bore. Pressure equalization has previously been accomplished by closing one end of the lubricant reservoir with a flexible membrane and venting the portion of the reservoir on the outside of the membrane to a point on the surface of the bit. This system has only been partially successful because the flexible membrane tends to rupture under large pressure differentials and the pressure differential across the seal tends to push the seal element into a position where it is damaged by other elements of the bit. A porous filter plug, as shown in U.S. Pat. No. 3,719,241 to W. R. Bell patented Mar. 6, 1973, has also been used for pressure equalization. However, bits incorporating prior art pressure equalizing systems have still been observed to operate (at least part of the time) with a pressure differential acting from outside the bit to the inside. It appears that a time lag in pressure equalization occurs, possibly as the bit is run in the hole, or more probably, during connections made every 30 feet during drilling. This requires the bit to be pulled off bottom into an area of lesser hydrostatic head. Subsequently, as the bit is returned to bottom, a pressure differential is created.

A wide variety of other environmental conditions also affect the performance of the pressure equalizing system. For example, the temperature will rise as the well bore penetrates deeper into the earth and temperatures up to 325°F are presently being encountered. Deep wells now being drilled are expected to result in environmental temperatures up to 400°F and the drilling of steam wells resulst in environmental temperatures as high as 550°F. The elevated temperatures have an adverse effect on the lubricant, the structural elements of the lubrication system, the structural elements of the pressure equalizing system, and a substantial increase in the pressure of the lubricant within the lubricant reservoir is generally encountered.

DESCRIPTION OF PRIOR ART

In U.S. Pat. No. 3,735,825 to W. S. Keller, patented May 29, 1973, a pressure equalizing system for rock bits is shown. A lubricant reservoir is positioned in each arm of a three-cone rotary rock bit to provide lubricant to bearings located between the bit's rotary cone cutters and the bearing shaft upon which the cutters rotate. A seal is positioned between the cutters and the bearing shaft to retain lubricant in the bearing area and to prevent borehole fluid and debris from entering the bearing area. A pressure equalizing passage provides communication between the lubricant reservoir and the outside of the bit. A two-way valve is positioned in the pressure equalizing passage to prevent excessive pressure differential from building up between lubricant in the lubricant reservoir and fluid outside of the bit by allowing lubricant from the lubricant reservoir to escape to the outside of the bit and allowing fluid outside of the bit to enter the lubricant reservoir.

In U.S. Pat. No. 3,476,195 to E. M. Galle, patented Nov. 4, 1969, a sealed bearing rotary rock bit is shown that includes a lubricant reservoir and a flexible membrane that encloses one end of the lubricant reservoir for equalizing the internal pressure of lubricant in the lubricant reservoir with the hydrostatic pressure of drilling fluid in the well bore. A check valve is provided which operates at low pressure to permit flow out of the lubricant reservoir to the outside of the bit but blocks any flow in the reverse direction.

In U.S. Pat. No. 3,719,241 to W. R. Bell, patented Mar. 6, 1973, a free breathing lubrication system for sealed bearing rock bits is shown. Three individual reservoirs are positioned in a three-cone rotary rock bit with one of the reservoirs in each of the arms of the bit for supplying lubricant to the bit bearing systems located between each of the three individual cone cutters and the bearing shafts upon which they rotate. A seal is positioned between each of the cone cutters and its bearing shaft to prevent the lubricant from escaping into the borehole and to prevent borehole fluids and debris from entering the bearing area. A passageway extends from each of the lubricant reservoirs to the exterior of the bit and a free breathing porous filter plug is positioned in each of the passageways thereby equalizing the internal pressure of lubricant in the lubricant reservoir and the hydrostatic pressure of drilling fluid in the well bore.

SUMMARY OF THE INVENTION

The present invention provides a rotary rock bit with apparatus for maintaining a predetermined pressure within the bearing cavity of the rotary rock bit to insure that the pressure of lubricant in the bearing cavity is at least as great as the pressure of fluid in the borehole outside of the bit and at the same time insure that lubricant in the bearing cavity will be continuously open to external pressure from fluid in the borehole outside of the bit so that any outside pressure increase is transmitted to the lubricant in the bearing cavity. The rotary rock bit includes a bit body with at least one bearing shaft extending from said bit body and a cutter rotatably mounted upon said bearing shaft. Bearing means are provided between the cutter and the bearing shaft to promote rotation of the cutter. A seal means is provided for retaining lubricant in the area between the cutter and the bearing shaft and preventing borehole fluids and debris from entering the bearing area. A lubricant reservoir is positioend in the bit body and means are provided for equalizing the pressure of lubricant in the lubricant reservoir with the pressure of fluid in the borehole. Passage means channel lubricant from the lubricant reservoir to the area between the cutter and the bearing shaft. Means are provided for allowing flow of lubricant from said lubricant reservoir to the area between the cutter and the bearing shaft in response to any pressure differential. Means are also provided for allowing flow of lubricant from the area between the cutter and the bearing shaft to the lubricant reservoir at pressure differentials above a predetermined pressure differential.

The above and other objects and advantages of the present invention will become apparent from a consideration of the following detailed description of the invention when taken in conjunction with the drawings.

DETAILED DESCRIPTION OF THE INVENTION

Figure 1:
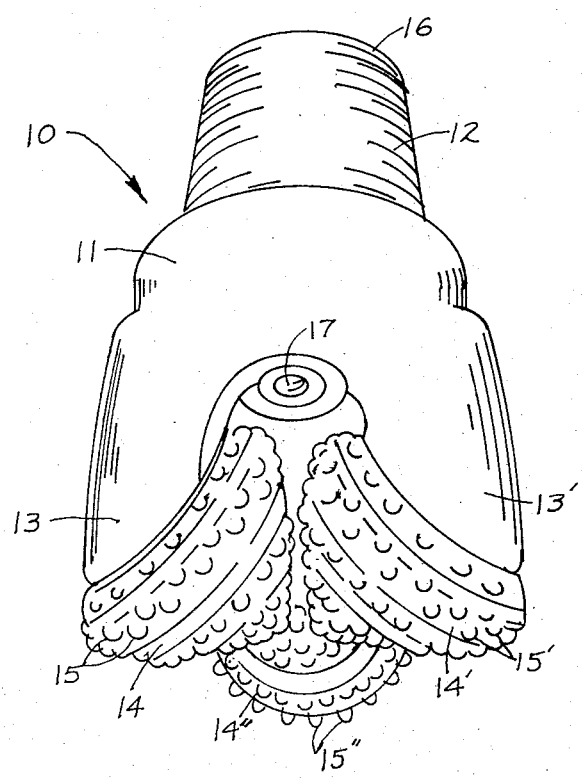
FIG. 1 is an illustration of a three-cone sealed bearing rotary rock bit constructed in accordance with the present invention.

Referring now to the drawings, and FIG. 1 in particular, shown therein and generally designated by the reference number 10 is a three-cone sealed bearing rotary rock bit. As illustrated, the bit 10 includes a bit body 11 including an upper threaded portion 12. The threaded portion 12 allows the bit to be connected to the lower end of a rotary drill string (not shown). Depending from the bit body 11 are three substantially identical arms with two of the arms 13 and 13' being shown in FIG. 1. The lower end of each of the arms is provided with an extended journal portion and details of this journal portion will be discussed subsequently. Three rotary cone cutters 14, 14', 14'' are rotatably positioned on three bearing pins extending from the arms. Each of the cutters 14, 14', 14'' includes cutting structure 15, 15', 15'' on its outer surface adapted to disintegrate the formations as the bit 10 is rotated and moved downward. The cutting structure 15, 15', 15'' is shown in the form of tungsten carbide inserts. However, it is to be understood that other cutting structures, such as steel teeth, may be used as the cutting structure on the cone cutters.

The bit 10 includes a central passageway 16 extending along a central axis of body 11 to allow drilling fluid to enter from the upper section of the drill (not shown) immediately above and pass downward through three jet nozzles, one nozzle 17 being shown in FIG. 1, past the cutting structure 15, 15', 15'' of the cone cutters 14, 14', 14''. In use, the bit 10 is connected as the lower member of a rotary drill string (not shown) is lowered into a well bore until the cone cutters engage the bottom of the well bore. Upon engagement with the bottom of the well bore, the drill string is rotated, rotating bit 10 therewith. Drilling fluid is forced down through the interior passage of the rotary drill string and continues through the central passageway 16 of bit 10 passing through the nozzles, past the cutting structure of the cutters to the bottom of the well bore, then upward in the annulus between the rotary drill string and the wall of the well bore carrying with it the cuttings and debris from the drilling operation.

Figure 2:
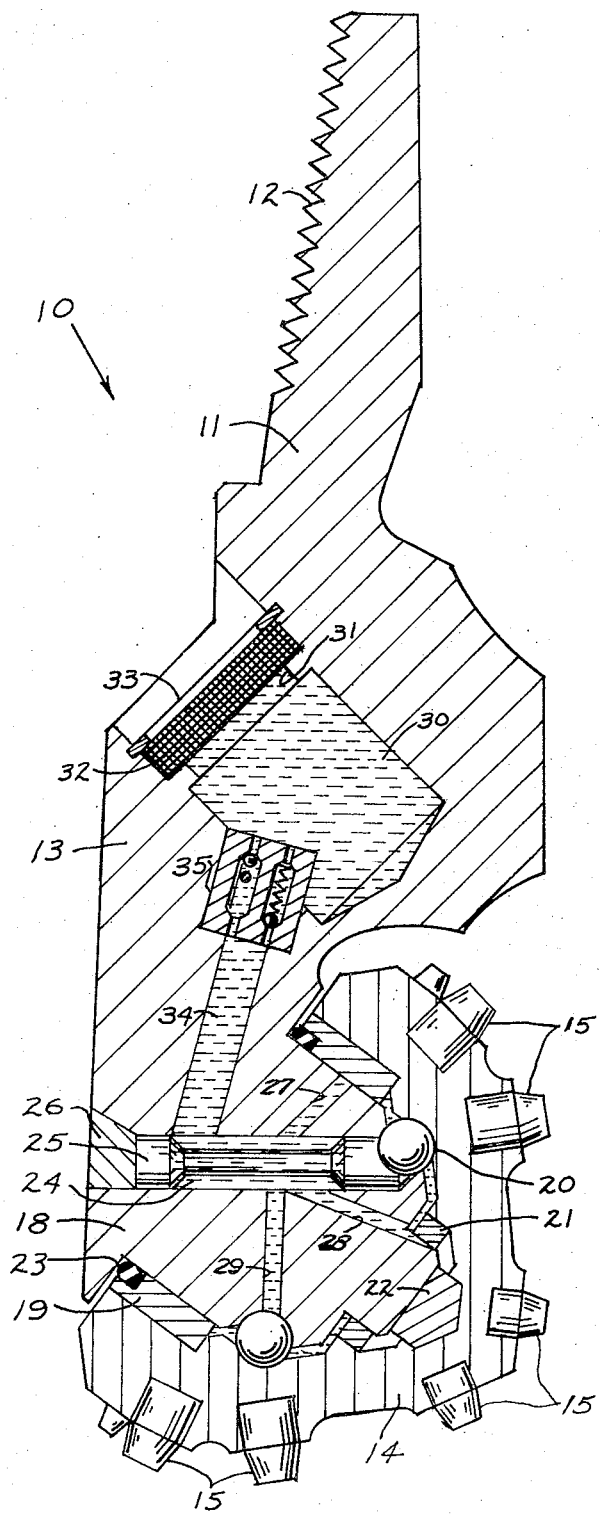
FIG. 2 is a sectional view of one arm of the bit of FIG. 1 showing the lubrication system.

Referring now to FIG. 2, a sectional view of one arm 13 of the bit 10 is shown. The cutter 14 is rotatably positioned on the journal portion of the arm 13 and adapted to disintiegrate earth formations as the bit is rotated. Cutting structure 15 on the surface of the cutter 14 can contact and disintegrate earth formations in a manner that is well known in the art. The journal portion of arm 13 consists of a bearing pin 18 upon which the cutter 14 is mounted. A plurality of bearing systems are located in the bearing area between the cutter 14 and the bearing pin 18. The bearing systems in the bearing area include an outer friction bearing 19, a series of ball bearings 20, an inner friction bearing 21, and a thrust button 22. An O-ring seal 23 is positioned between the cutter 14 and the bearing pin 18. This seal retains lubricant in the bearing area around the bearing systems and prevents any materials in the well bore from entering the bearing area. The O-ring seal 23 prevents flow in either direction. A passageway 24 is provided to allow lubricant to be transmitted to the bearing systems. The passageway 24, as shown, also allows the balls that make up the ball bearing system 20 to be inserted in position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing area. Additional passageways 27, 28, and 29 extend from passageway 24 to the bearing area to insure a sufficient supply of lubricant to bearings 19, 20, 21, and 22.

A lubricant reservoir 30 is located in the arm 13 to provide a supply of lubricant to the bearings. A passageway 31 connects lubricant reservoir 30 with the external surface of the bit 10. A free-breathing porous filter plug 32 is locked in place by a snap ring 33 in the passageway 31 and provides a flow dampening effect that will restrict penetration of turbulent fluids either into or out of the system. The plug 32 prevents any substantial amount of fluid flow into or out of the system in response to pressure demands and creates a dead-end trap whereby lubricant is retained inside of lubricant reservoir 30. The plug 32 is constructed of sintered metal and produces a porous and permeable plug.

A passageway 34 connects the lubricant reservoir 30 with the passageway 24 allowing lubricant to be transmitted to the bearing area. A valve unit 35 is positioned in the passageway 34 and the details of the valve unit 35 will be discussed subsquently with reference to FIG. 3.

Figure 3:
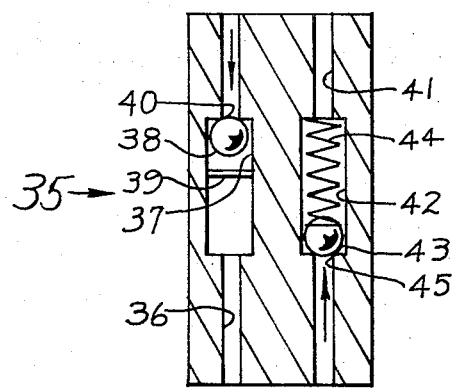
FIG. 3 is an enlargement of an element of the bit shown in FIGS. 1 and 2.

Referring to FIG. 3, the valve unit 35 is shown in greater detail. The valve unit 35 insures that pressure of fluid in the borehole outside of the bit will be transmitted to the bearing area continuously through a one-way valve that activates with any pressure build-up and that pressure within the bearing area will be maintained at a predetermined level by a spring loaded one-way valve with excess pressure above said predetermined level being released to the outside of the bit. A first passageway 36 extends through the valve unit 35. An enlarged portion 37 of the passageway 36 contains a ball 38. A pin 39 extends across the enlarged portion 37 of the passageway 36 below the ball 38. Lubricant from the lubricant reservoir 30 can flow through the passageway 36 moving the ball 38 from a valve seat 40 on the upper end of the enlarged portion 37 of the passageway 36 through the valve unit 35 to the area between the bearing pin 18 and cutter 14. The pin 39 prevents the ball 38 from blocking flow through the lower end of the enlarged portion 37 of the passageway 36.

A second passageway 41 extends through the valve unit 35. An enlarged portion 42 of the passageway 41 contains a ball 43. A spring 44 exerts a predetermined force on ball 43 forcing ball 43 against valve seat 45. Should pressure of lubricant in the area between the bearing pin 18 and cutter 14 build up pressure greater than the force of spring 44, ball 43 will be moved from the valve seat 45 allowing flow of the lubricant back to the lubricant reservoir 30 until the excess pressure has been released.

The structural details of a bit constructed in accordance with the present invention having been described, the operation of the bit 10 will now be considered. The bit 10 is connected to the lower end of a rotary drill string and lowered into a well bore. The hydrostatic pressure of fluid in the well bore increases as the bit 10 is lowered deeper into the well bore. The hydrostatic pressure of fluid in the well bore is substantial and a pressure differential between the pressure of lubricant inside of the bit 10 and the pressure of fluid in the borehole would ordinarily develop. The porous filter plug 32 allows the pressure of fluid in the well bore to be transmitted to the lubricant in the lubricant reservoir 30 and the passageway 36 in valve unit 35 allows the pressure to be transmitted to the lubricant in the bearing area.

During the drilling operation, rotation of the bit must be stopped periodically in order to add an additional section of drill pipe. The bit 10 is lifted off bottom during the addition of the new section of drill pipe and raised in the borehole a short distance. This may bring the bit to a location wherein the pressure of fluid in the borehole is less than that encountered during drilling. Prior art pressure equalizing systems would allow the pressure of the lubricant in the bearing area to be equalized with the pressure of fluid in the borehole. This would result in a pressure differential existing from the outside of the bit to the inside across the seal when the bit was again lowered into position for drilling because of a time lag in the pressure equalization. The starting and stopping of the mud pumps during the drilling operation also tends to create the aforementioned condition.

The present invention prevents a pressure differential from being established across the seal acting from the outside of the bit to the inside of the bit in the bearing area. Once pressure is maximized and equalized in the bearing area between the bearing pin 18 and cutter 14, that pressure will be maintained. The ball 38 prevents flow from the bearing area to the lubricant reservoir through passageway 36. The ball 43 and spring 44 prevents flow of lubricant from the bearing area to the lubricant reservoir unless the pressure of lubricant in the bearing area exceeds the force of spring 44. The present invention insures that throughout the drilling operation the bit will not be exposed to a condition wherein pressure of the fluid in the borehole is greater than the pressure of the lubricant in the bearing area. Thie will insure that borehole fluid and debris will not be introduced to the bearing area.

Figure 4:
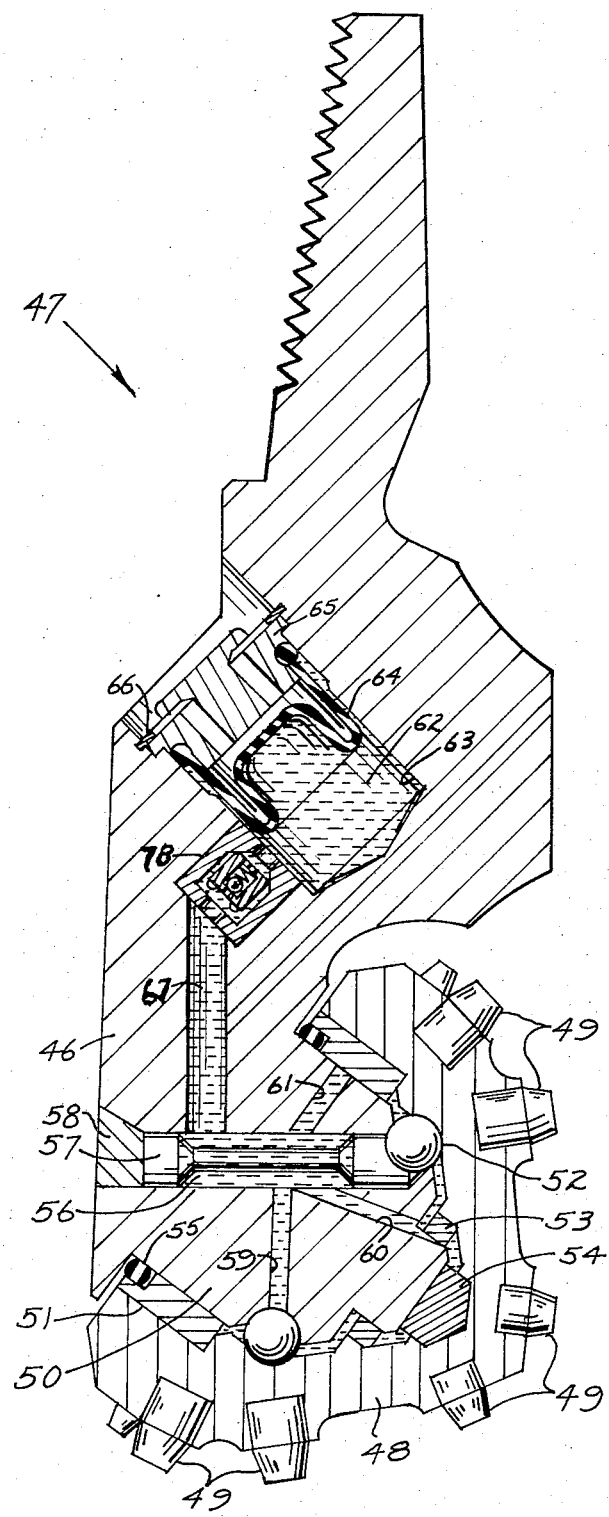
FIG. 4 illustrates another embodiment of the bit of the present invention.

Referring now to FIg. 4, a sectional view of one arm 46 of another embodiment of a bit 47 constructed in accordance with the present invention is shown. A cutter 48 is rotatably positioned on the journal portion of the arm 46 and adapted to disintegrate earth formations as the bit is rotated. Cutting structure 49 on the surface of the cutter 48 can contact and disintegrate earth formations in a manner that is well known in the art. The journal portion of arm 46 consists of a bearing pin 50 upon which the cutter 48 is mounted. A plurality of bearing systems are located in the bearing area between the cutter 48 and the bearing pin 50. The bearing systems in the bearing area include an outer friction bearing 51, a series of ball bearings 52, an inner friction bearing 53, and a thrust button 54. An O-ring seal 55 is positioned between the cutter 48 and the bearing pin 50. This seal retains lubricant in the bearing area around the bearing systems and prevents any materials in the well bore from entering the bearing area. The O-ring seal 55 prevents flow in either direction. A passageway 56 is provided to allow lubricant to be transmitted to the bearing systems. The passageway 56, as shown, also allows the balls that make up the ball bearing system 52 to be inserted in position after the cone cutter 48 is placed on the bearing pin 50. The series of ball bearings 52 serves to lock the cone cutter 48 on bearing pin 50. After the balls are in place, a plug 57 is inserted into the passageway 56 and welded therein by weld 58. Plug 57 has a reduced diameter throughout the major portion of its length to allow lubricant to be transmitted to the bearing area. Additional passageways 59, 60, and 61 extend from passageway 56 to the bearing area to insure a sufficient supply of lubricant to bearings 51, 52, 53, and 54.

A lubricant reservoir 62 is located in the arm 46 of bit 47. The lubricant reservoir 62 is formed by a bore 63 that extends from the surface of the bit 47 into the arm 46 of the bit 47. The outer end of the bore 63 is closed by a flexible diaphragm 64 that provides equalization between the pressure of fluid in the borehole and the pressure of lubricant in the lubricant reservoir 62. The flexible diaphragm 64 is held in place by a canister 65 and a lock ring 66. A passageway 67 connects the lubricant reservoir 62 with the passageway 56 allowing lubricant to be transmitted to the bearing area. A valve unit 78 is positioned in the passageway 67 and the details of the valve unit 78 will be discussed subsequently with reference to FIGS. 5 and 6.

Figure 5:
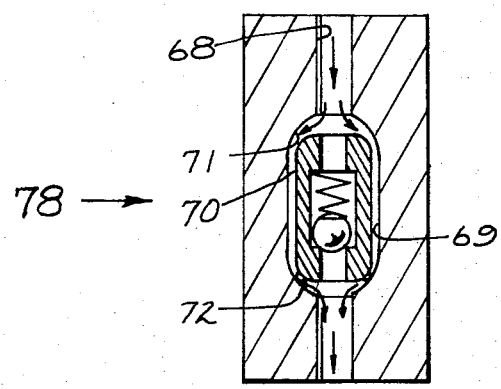
FIG. 5 is an enlargement of an element of the bit shown in FIG. 4.
Figure 6:
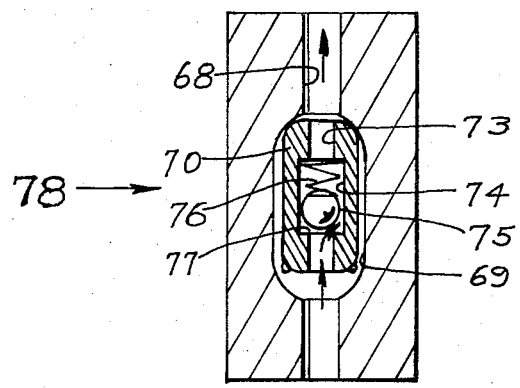
FIG. 6 is another view of the element shown in FIG. 5.

Referring now to FIGS. 5 and 6, the valve unit 78 is shown in greater detail. The valve unit 78 insures that pressure of fluid in the borehole outside of the bit will be transmitted to the baring area continously through a valve that activates with any pressure build-up and that pressure within the bearing area will be maintained at a predetermined level by the valve with excessive pressure above said predetermined level bieng released to the oustide of the bit. A passageway 69 extends through the valve unit 78. An enlarged portion 69 of the passageway 68 contains a moveable valve element 70. The valve element 70 can move to a position wherein it seats against valve seat 71 to close the passageway 68 or to a position as shown in FIG. 5 wherein lugs 71 contact the side of passageway 68 allowing flow from the lubricant reservoir 62 to the bearing area. A passageway 73 extends through the valve element 70. An enlarged portion 74 of the passageway 73 contains a ball 75. A spring 76 exerts a predetermined force on ball 75 forcing ball 75 against valve seat 77. Should pressure of lubricant in the area between the bearing pin 50 and the cutter 48 build up pressure greater than the force of spring 76, ball 75 will be moved from the valve seat 77 allowing flow of the lubricant back to the lubricant reservoir 62 until the excess pressure has been released.

The structural details of a bit 47 constructed in accordance with the resent invention having been described, the opertion of the bit 47 will not be considered. The bit is connected to the lower end of a rotary drill string and lowered into a well bore. The hydrostatic pressure of fluid in the well bore increases as the bit 47 is lowered deeper into the well bore. The hydrostatic pressure of fluid in a well bore is substantial and a pressure differential between the pressure of lubricant inside of the bit 47 and the pressure of fluid in the borehole would ordinarily develop. The flexible diaphragm 64 allows the pressure of fluid in the well bore to be transmitted to the lubricant in the lubricant reservoir 62 and the valve unit 78 allows the pressure to be transmitted to the lubricant in the bearing area. During the drilling operation, rotation of the bit must be stopped periodically in order to add an additional section of drill pipe. The bit 47 is lifted off bottom during the addition of the new section of drill pipe and raised in the borehole a short distance. This may bring the bit to a location wherein the pressure of fluid in the borehole is less thatn that encountered during drilling. Prior art pressure equalizing systems would allow the pressure of the lubricant in the bearing area to be equalized with the pressure of fluid in the borehole. This would result in a pressure differential existing from the outside of the bit to the inside across the seal when the bit was again lowered into position for drilling because of a time lag in pressure equalization. The starting and stopping of the mud pumps during the drilling operation also tends to create the aforementioned conditions.

The present invention prevents a presssure differential from being established across the seal acting from the outside of the bit to the inside of the bit in the bearing area. Once pressure is maximized and equalized in the bearing area between the bearing pin 50 and the cutter 48, that pressure will be maintained. The valve unit 78 prevents flow from the bearing area to the lubricant reservoir 62 through passagway 68. The ball 75 and spring 76 prevent flow of lubricant from the bearing area to the lubricant reservoir 62 unless the pressure of lubricant in the bearing area exceeds the force of spring 76. The present invention insures that througout the drilling operation, the bit will not be exposed to any condition wherein pressure of the fluid in the borehole is greater than the pressure of the lubricant in the bearing area. This will insure that borehole fluid and debris will not be introduced into the bearing area.

The embodiments of the invention in which an exclusive property or privilege is claimed are defined as follows:

1. A sealed bearing rotary rock bit with an internal reservoir containing lubricant for drilling in a fluid-filled borehole wherein pressure differentials occur between the pressure of the lubricant in the internal reservoir and the fluid in the borehole, comprising:

a bit body;

at least one bearing shaft extending from said bit body;

a cutter rotatably mounted upon said bearing shaft;

bearing means between said cutter and said bearing shaft for promoting rotation of said cutter;

a lubricant area between said cutter and said bearing shaft;

seal means for retaining lubricant in said lubricant area and preventing fluid in the borehole from entering the lubricant area;

a lubricant reservoir in said bit body;

means for equalizing the pressure of lubricant in the lubricant reservoir with the pressure of fluid in the borehole;

passage means channeling lubricant from said lubricant reservoir to said lubricant area;

means for allowing flow of lubricant from said lubricant reservoir to said lubricant area in response to any pressure differential; and means for allowing flow of lubricant from said lubricant area to said lubricant reservoir at pressure differentials above a predetermined pressure differential.

2. The sealed bearing rotary rock bit of claim 1 whrein said means for allowing flow of lubricant from said lubricant reservoir to said lubricant area in response to any pressure differential is a one-way valve and said means for allowing flow of lubricant from said lubricant area to said lubricant reservoir at pressure differentials above a predetermined pressure differential is a spring-loaded one-way valve.

3. A sealed bearing rotary rock bit with an internal reservoir containing lubricant for drilling a fluid-filled borehole wherein pressure differentials occur between the pressure of the lubricant in the internal reservoir and the pressure of fluid in the borehole, comprising:

a bit body;

at least one bearing shaft extending from said bit body;

a cutter rotatably mounted upon said bearing shaft;

bearing means between said cutter and said bearing shaft for promoting rotation of said cutter;

a lubricant area between said cutter and said bearing shaft;

seal means for retaining lubricant in said lubricant area and preventing fluid in the borehole from entering the lubricant area;

a lubricant reservoir in said bit body;

a passage extending from said lubricant reservoir to the exterior of said bit body;

a porous filter plug in said passage for equalizing the pressure of lubricant in the lubricant reservoir with the pressure of fluid in the borehole;

passage means for channeling lubricant from said lubricant reservoir to said lubricant area;

means for allowing flow of lubricant from said lubricant reservoir to said lubricant area in response to any pressure differential; and means for allowing flow of lubricant from said lubricant area to said lubricant reservoir at pressure differentials above a predetermined pressure differential.

4. The sealed bearing rotary rock bit of claim 3 wherein said means for allowing flow of lubricant from said lubricant reservoir to said lubricant area in response to any pressure differetnial is a one-way valvle and said means for allowing flow of lubricant from said lubricant area to said lubricant reservoir at pressure differentials above a predetermined pressure differential is a spring-loaded, one-way valve.

5. A sealed beairng rotary rock bit with an internal reservoir containing lubricant for drilling in a fluid-filled borehole wherein pressure differentials occur between the pressure of the lubricant in the internal reservoir and the fluid in the borehole, comprising:

a bit body;

at least one bearing shaft extending from said bit body;

a cutter rotatably mounted upon said bearing shaft;

bearing means between said cutter and said bearing shaft for promoting rotation of said cutter;

a lubricant area between said cutter and said bearing shaft;

seal means for retining lubricant in said lubricant area and preventing fluid in the borehole from entering the lubricant area;

a lubricant reservoir in said bit body;

a flexible diaphragm positioned in said lubricant reservoir dividing said lubricant reservoir into a lubricant storage portion and a pressure equalizing portion;

means for allowing the pressure of fluid in the borehole to be transmitted to the pressure equalizing portion;

passage means for channeling lubricant from said lubricant storage portion to said lubricant area;

means for allowing flow of lubricant from said lubricant storage portion to said lubricant area in response to any pressure differential; and means for allowing flow of lubricant from said lubricant area to said lubricant storage portion at pressure differentials above a predeterimed pressure differential.

6. The sealed bearing rotary rock bit of claim 5 wherein said means for allowing flow of lubricant from said lubricant storage portion to said lubricant area in response to any pressure differential is a one-way valve and said means for allowing flow of lubricant from said lubricant area to said lubricant storage portion at pressure differentials above a predetermined pressure differential is a spring-loaded, one-way valve.

* * * * *

PO-1050
(5/69)

UNITED STATES PATENT OFFICE
CERTIFICATE OF CORRECTION

Patent No. 3,866,695            Dated February 18, 1975

Inventor(s) Robert Allen Jackson

It is certified that error appears in the above-identified patent and that said Letters Patent are hereby corrected as shown below:

Column 8, Claim 1, line 32:    After "means" insert --for--

Column 8, Claim 3, line 51:    After "drilling" insert --in--

Column 9, Claim 4, line 16:    "differetnial" should read --differential--

Column 9, Claim 4, line 16:    "valvle" should read --valve--

Column 9, Claim 5, line 21:    "beairng" should read --bearing--

Column 10, Claim 5, line 3:    "retining" should read --retaining--

Signed and sealed this 1st day of July 1975.

(SEAL)
Attest:

RUTH C. MASON
Attesting Officer

C. MARSHALL DANN
Commissioner of Patents
and Trademarks